US009921946B2

(12) United States Patent
Udvuleanu et al.

(10) Patent No.: US 9,921,946 B2
(45) Date of Patent: Mar. 20, 2018

(54) METHOD AND SYSTEM TO DISPLAY AND BROWSE PROGRAM TRACE USING SOURCE CODE DECORATION

(71) Applicant: Freescale Semiconductor, Inc., Austin, TX (US)

(72) Inventors: Mihai Udvuleanu, Bucharest (RO); Razvan Lucian Ionescu, Bucharest (RO); Radu-Marian Ivan, Bucharest (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/943,697

(22) Filed: Nov. 17, 2015

(65) Prior Publication Data

US 2017/0075792 A1 Mar. 16, 2017

(30) Foreign Application Priority Data

Sep. 16, 2015 (RO) ................. A201500666

(51) Int. Cl.
*G06F 9/44* (2006.01)
*G06F 11/36* (2006.01)

(52) U.S. Cl.
CPC ................. *G06F 11/3668* (2013.01)

(58) Field of Classification Search
CPC ........... G06F 11/3611; G06F 11/3636; G06F 11/3644; G06F 11/3664
USPC ........................................ 717/125
See application file for complete search history.

(56) References Cited

U.S. PATENT DOCUMENTS

| 6,513,155 | B1* | 1/2003 | Alexander, III | .... G06F 11/3409 |
| | | | | 717/124 |
| 8,635,598 | B2 | 1/2014 | Roberts et al. | |
| 2005/0183062 | A1* | 8/2005 | Ubukata | ............... G06F 9/4426 |
| | | | | 717/104 |
| 2008/0263520 | A1 | 10/2008 | Aguilar et al. | |
| 2008/0320442 | A1* | 12/2008 | Lyon-Smith | .............. G06F 8/33 |
| | | | | 717/109 |

(Continued)

FOREIGN PATENT DOCUMENTS

| WO | 2012143760 A1 | 10/2012 |
| WO | 2013128238 A1 | 9/2013 |

(Continued)

OTHER PUBLICATIONS

Lauterbach Development Tools, Flyer for Trace 32 Debug & Trace ARM, downloaded Nov. 16, 2015 www.lauterbach.com/bdmarm.html.

(Continued)

*Primary Examiner* — Duy Khuong Nguyen

(57) ABSTRACT

A method and apparatus are provided for navigating source code (112) by capturing a program trace data history (134) from a target (150) in response to execution of application executable code (123) thereon and decorating the source code blocks (252) on a graphical user interface viewer (251) by displaying an execution instance control indicator (253-255) corresponding to each detected execution instance, where an execution instance control enables control of which execution instance is displayed and an execution instance indicator displays information about the sequence of instructions that were executed at runtime in that execution instance.

18 Claims, 8 Drawing Sheets

(56) References Cited

U.S. PATENT DOCUMENTS

| | | | |
|---|---|---|---|
| 2012/0233600 A1* | 9/2012 | Uno | G06F 11/3636 717/128 |
| 2015/0052406 A1* | 2/2015 | Garrett | G06F 11/1448 714/45 |
| 2016/0124834 A1* | 5/2016 | Davis | G06F 11/366 712/227 |

FOREIGN PATENT DOCUMENTS

| | | | |
|---|---|---|---|
| WO | 2014016649 A1 | 1/2014 | |
| WO | 2014024000 A1 | 2/2014 | |

OTHER PUBLICATIONS

LCOV Code Coverage Report, printed Jun. 17, 2015 http://ltp.sourceforge.net/coverage/lcov/output/example/methods/iterate.c.gcov.html.

Red Lizard Software, Security, Agile Static Testing, Quality and Code Compliance, printed Jul. 20, 2015 http://redlizards.com/goanna-3-1-released/.

Diver, Welcome to Diver, printed Jun. 17, 2015 http://diver.sourceforge.net/docs/Diver.html.

\* cited by examiner

```
340 ─┐                341
                      ┌┴┐
    int main ()    ┌─ 1 - _startup / 1 ▼ ─┐  ┌─ [189488] ─┐ ─ 342
    {
        f0 ( ) ;
        f1 ( ) ;
        for (int i = 0, i < 3; i ++    ┌─ 1 / 3 ▼ ─┐  ┌─ [189494] ─┐ ─ 344
        {                                  └┬┘
           ┌─  if (i ! = 0)                 343
           │   {
    345 ──┤         f3 ( ) ;
           │   }
           └─> // other instructions
        }
        int sel = 1;
      ┌─ switch (sel)
      │  {
    346┤      case 0:
      │           // case 0 instructions
      │           break;
      │      case 1:
      └──>       // case 1 instructions
                break;
    347 ─┐  case 2:
         │      // case 2 instructions
         │      break;
         }
         └> if (1) // (taken)
         {
             f0 ( );
                 // this access will
                 // cause an exception
             *g_ pIllegalPointer = 0;  ┌─ ⚡ _exception_handler ─┐ ─ 349
         }
```

FIG. 7

```
350 ─┐                           351
                                 ┌┴┐
    void _exception_handler( )  ┌─ 1 - main / 1 ▼ ─┐  ┌─ [190964] ─┐ ─ 352
    {
        // exception handler instructions
    }
```

FIG. 8

METHOD AND SYSTEM TO DISPLAY AND BROWSE PROGRAM TRACE USING SOURCE CODE DECORATION

BACKGROUND OF THE INVENTION

Field of the Invention

The present invention is directed in general to program code analysis. In one aspect, the present invention relates to a method, apparatus, system, and computer program product for navigating the execution history of source code.

Description of the Related Art

Existing software development tools for editing, compiling, and debugging software typically include analysis tools for viewing information about a program's execution. Tracing is a known technique for providing such analysis, and involves recording information during program execution to generate a trace log that can be analyzed to provide an indication of the application progress during execution. For example, program trace tools are typically executed by a program debugger to generate and display a program execution trace in a predetermined format (e.g., trace event table format or CallTree structure with collapsible nodes on each function call boundary) which contains a list of events that help identify the program flow, like branches, function calls, and the like. However, such program execution traces do not efficiently or intuitively convey control flow information about the program execution to the developer and do not provide an efficient trace search mechanism for identifying the points when certain functions were called, thereby impeding the ability to identify the root-cause of a problem during program execution, especially for large traces. As a result, the existing solutions for capturing, analyzing, and displaying information about a program's execution are extremely difficult at a practical level.

BRIEF DESCRIPTION OF THE DRAWINGS

The present invention may be understood, and its numerous objects, features and advantages obtained, when the following detailed description is considered in conjunction with the following drawings.

FIG. 7 illustrates a fifth decorated source code sequence with execution instance controls and indicators displayed at a source code editor viewer to indicate an exception use case in accordance selected embodiments of the present disclosure.

FIG. 8 illustrates a sixth decorated source code sequence with execution instance controls and indicators displayed at the source code editor viewer after selection of the exception hyperlink control in the sixth decorated source code sequence shown in FIG. 7.

DETAILED DESCRIPTION

A source code decorator computer product, computing device, system, and methodology are described for using program trace information to decorate source code lines in source code blocks with one or more execution instance controls or indicators for displaying and browsing the source code execution history. In this context, an Execution Instance (EI) of a code block will be understood to refer to the moment in time when at least one instruction from the code block was executed on the target. For example, an Execution Instance of a function identifies one moment in time when the function was called during the program execution on the target. In similar fashion, an Execution Instance of a loop identifies the moment when a loop iteration was executed. In selected embodiments, a set of source code decoration elements are displayed with an associated source code sequence in a GUI viewer of the source code editor to display program control flow information at a post-mortem moment. The source code decoration element may include a drop-down control element attached to a code line to select a certain loop iteration or function call. In addition or in the alternative, the source code decoration element may include an arrow-shaped decoration element to show which branch or jump was taken during a selected execution instance of the source code. In addition or in the alternative, the source code decoration element may include a timestamp text box for displaying time information for the selected execution instance of the source code. In addition or in the alternative, the source code decoration element may include a hyperlink element that allows navigating between different execution instances of the source code. In selected embodiments, all function calls in the source code are decorated with hyperlink and drop-down control elements. In addition or in the alternative, the source code decoration element may include an interrupt or exception indication control element to identify the moment when the execution instance has been interrupted. In selected embodiments, the interrupt/exception indication control element may also include a hyperlink element to the interrupt handler execution instance. At the source code decorator, execution instances associated with code blocks (i.e., functions and loops) are decorated with execution instance control indicators on a per-block basis so that, for a code block, an execution instance can be selected (e.g., using the drop down control) and afterwards the system will decorate sources to show the sequence of instructions that were executed at runtime in that execution instance.

Figure 1:
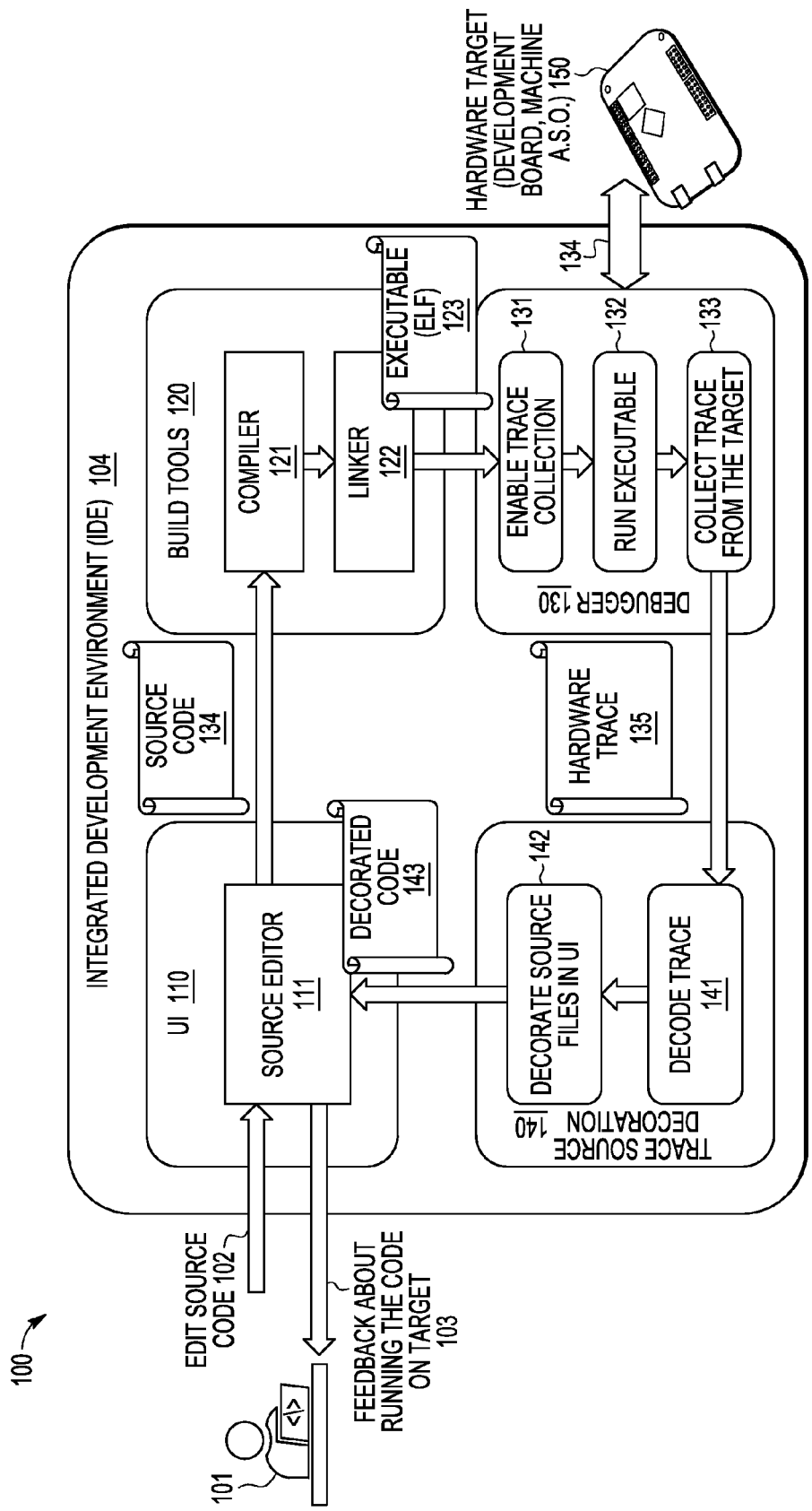
FIG. 1 illustrates a simplified block diagram of an apparatus for developing application program code in accordance with selected embodiments of the present disclosure.

Turning now to FIG. 1, there is shown a simplified schematic block diagram of an integrated development environment (IDE) system 100 for developing application program code in accordance with selected embodiments of the present disclosure. The IDE system 100 may be implemented within a variety of systems and apparatuses for developing application program code, or within alternative software development tools. Furthermore, because the illustrated embodiments of the IDE system 100 may be implemented at least in part using electronic components and circuits known to those skilled in the art, details will not be explained in any greater extent than that considered necessary for the understanding and appreciation of the underlying concepts of the present disclosure in order not to obfuscate or distract from the teachings herein.

The depicted IDE system 100 may be used by a software developer 101 to develop application program code, such as application program code for execution on a hardware target 150, such as an embedded system, development board or machine. In the illustrated example, the IDE system 100 includes an IDE 104 arranged to execute one or more software development tools or components 110, 120, 130, 140 on one or more central processing units (CPUs) (not shown).

The IDE 104 further includes one or more local development resources (not shown) that may be accessed or stored within one or more areas of local memory, such as stored within one or more local hard drives or optical drivers, or stored within one or more areas of local Flash memory or RAM (Random Access Memory). Such development resources may include, by way of example, application source code files for application program code under development, source code library files, trace files for application program code under development, IDE project files for application program code under development, etc. The IDE 104 may also have access to remote development resources stored, for example, at a remote server that is accessible via a local area network (LAN) or the like. Such remote development resources may be downloaded from or accessed at the remote server to the IDE 104 as required, thereby adding to or replacing some or all of the local development resources. In this manner, public development resources may be accessed by the IDE 104. For example, application program code for an application under development may be "checked out" and downloaded for further development on the IDE 104. Furthermore, local development resources may be uploaded to the remote server and made available to other computer systems. For example, application program code for an application under development that was being developed on the IDE 104 may be "checked in" and uploaded to the remote server when no longer being developed, thereby allowing further development of the application program code on other computer systems (not shown).

To facilitate code development by the software developer 101, the software development components 110, 120, 130, 140 in the IDE 104 are connected in a feedback loop which allows the developer 101 to use program trace information to decorate associated source code lines with one or more execution instance controls or indicators for displaying and browsing the source code execution history. In particular, the IDE 104 includes a user interface (UI) component 110 which includes, for example, one or more input devices, such as a keyboard, pointer device, etc. and one or more output devices such as a computer screen, etc. With the UI 110, a user 101 is able to interact with the computer program code running on the IDE 104, including a source code editor 111 for editing source code 102 and providing user feedback 103 about the how the source code is running on the target 150.

In particular, the software developer or user 101 uses the source code editor 111 to load, edit, and or view 102 the source code 112 for delivery to the build tool component 120 where the received source code 112 is compiled and linked. As depicted, the build tool component 120 may include a compiler 121 and linker 122 for compiling and linking the source code 112 into an Executable and Linkable Format (ELF) file 123. The generated ELF file 123 is then processed at the debugger component 130 which enables trace collection 131 and runs the ELF file 132 on the hardware target 150 to collect hardware trace information 135 from the hardware target 133. The connection 134 between the debugger 130 and hardware target 150 may be any desired communication interface, such as a LAN, debug probe connected on the USB port of the PC, or other suitable debug/IDE communication interface. At the trace source decorator 140, the hardware trace information 135 is decoded at the decoder 141 and then used at decorator 142 to generate decorated source code 143 for delivery to the UI component 110, thereby closing the feedback loop from the target hardware 150 to the developer 101. In this way, the collected hardware trace information 135 is returned to the developer 101 at the source code editor 111 as decorated source code 143 which is displayed at the UI viewer 110 as a feedback, giving runtime information about how the code (displayed in source code editor 111) has been executed on hardware, in what sequence and what timings.

Figure 2:
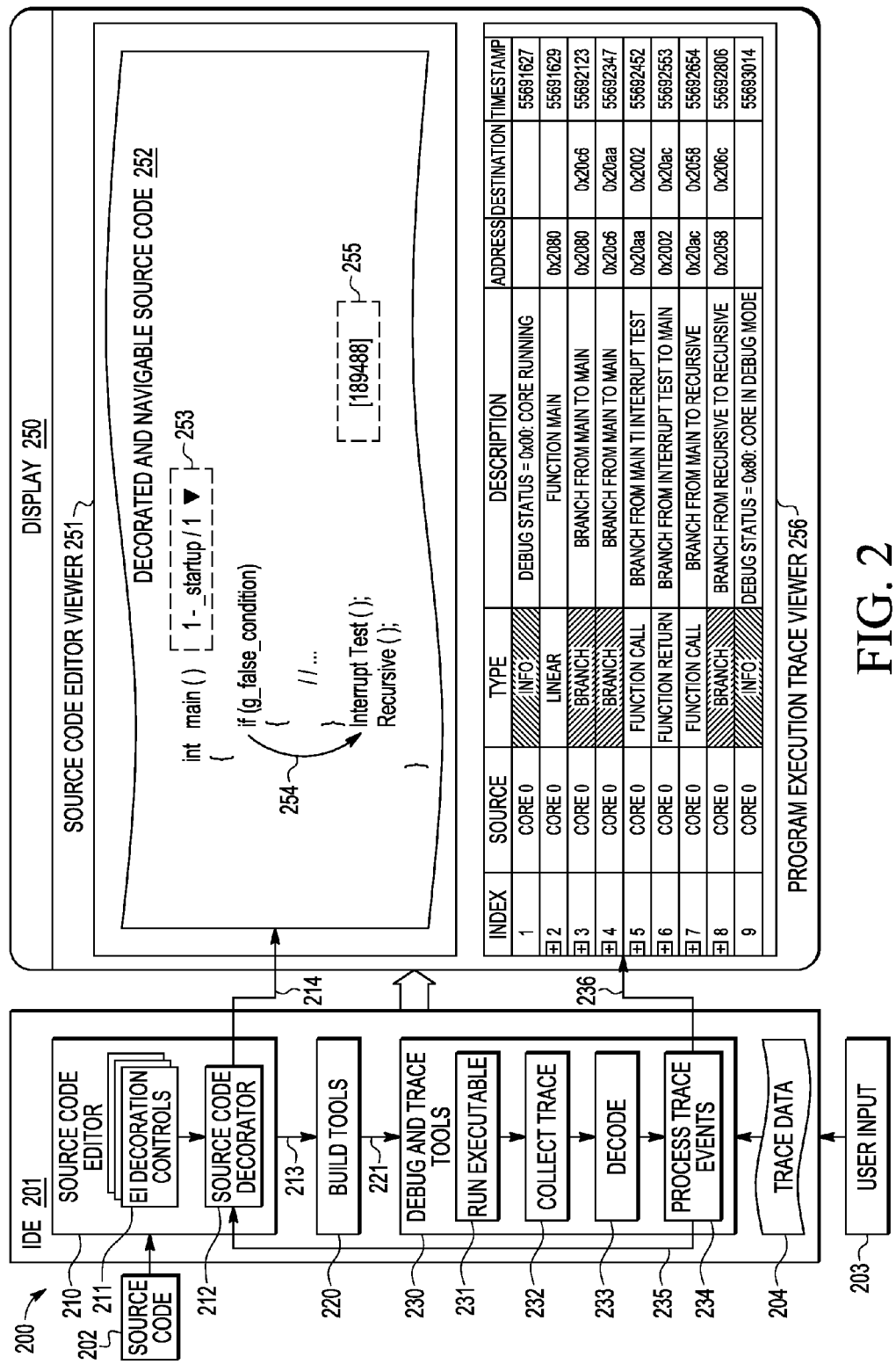
FIG. 2 illustrates a simplified block diagram of a software development tool in accordance with selected embodiments of the present disclosure.

Referring now to FIG. 2, there is illustrated a simplified block diagram of a software development tool 200 in accordance with selected embodiments of the present disclosure. The software development tool 200 includes an IDE 201 that provides facilities to computer programmers for software development, and typically consists of a source code editor 210, build tools 220, and a debugger 230. Some IDEs may further include an interpreter. Example embodiments of the IDE 201 are a CodeWarrior or Eclipse™.

The IDE 201 is arranged to receive application source code 202, for example by loading one or more source code files in response to user input 203. The IDE 201 includes a source code editor component 210 that enables a user to edit the source code files 202 by way of user input commands illustrated generally at 203.

The IDE 201 also includes a build tools component 220 which is arranged to receive application source code 213 from the source code editor 210. Using one or more build tools in the build tools component 220, the scripting of the compile and link steps for the various program code modules required to generate the binary code for the application program may be substantially automated. In addition, the IDE 201 may further include a compiler or interpreter (not shown) for implementing the generated compile and link steps.

The IDE 201 also includes a debugger component 230 which is arranged to receive executable files 221 from the build tools component 220, alone or in combination with debug information from previous execution runs of application program code under development, such as trace data 204. In the illustrated example, the debug and trace tool component 230 includes a first unit or module 231 for running the executable code on the target hardware, a second unit or module 232 for collecting trace information from target hardware, a third unit or module 233 for decoding the collected trace information, and fourth unit or module 234 for processing the decoded trace events to generate program execution trace information 235. Though not shown, the debugger component 230 may also include a trace viewer component for displaying the program execution trace information 236 at display 250. Conventionally, program trace information is displayed by an IDE 201 in a separate trace viewer interface 256 as a table format listing of events (e.g., info, linear, branches, function calls, function returns, etc.) which may be used to help identify the program flow. In this table format listing of events, it is difficult to search the trace to identify the points when certain functions were called is difficult, especially for large traces.

To facilitate the identification of root-cause events for a problem during program execution, the source code editor 210 includes a source code decorator component 212 arranged to receive source code 202 and program execution trace information 235. At the source code decorator component 212, each executed line of source code is associated with one or more program traces to define an execution instance such that each execution instance of a source code line or function identifies one moment or instance when the source code line/function was called. In selected embodiments, the association mechanism between the source code 202 and trace information 235 may be based on the Program Counter (PC) since the trace information 235 collected at the debugger component 230 contains the PC/address for each executed instruction. Likewise, the source information in the executable file 221 (e.g., exe/elf and so on) received at the debugger component 230 includes, for each source line, a set of instructions including program counter (PC) values. In this way, the common PC values may be used to link trace information with a source line sharing the same PC value. With such an association mechanism, the source code decorator component 212 can determine from the collected trace data what source lines were executed and also their execution order, thereby identifying branches and function calls. The processing of the source code 202 and program execution trace information 235 by the source code decorator component 212 may also identify other execution instance parameters, such as an execution instance time stamp value associated with an execution instance. In addition or in the alternative, the source code decorator component 212 may process the source code 202 and program execution trace information 235 to identify the target or destination source code line taken at a branch or jump during a particular execution instance. In addition or in the alternative, the source code decorator component 212 may identify interrupt or exception events from the source code 202 and program execution trace information 235 when a particular execution instance has been interrupted.

In selected embodiments, the source code decorator component 212 may process each assembly language instruction associated with each line of source code 202 using a compiler or similar functionality. In addition, the source code decorator component 212 associates each line of assembly instruction with corresponding program trace data 235. At the source code decorator component 212, the compiled source code and program trace information are combined for display together using a source code decoration procedure. In addition, the source code decorator component 212 may also use the compiled source code and program trace information to generate visual cue elements and control elements which are displayed with the source code lines to provide source code navigation indications to a viewer that may be used to analyze a line of source code currently being executed in a program optimization procedure. For example, the compiled source code and program trace information may be used by the source code decorator component 212 to generate and attach visual cue elements (e.g., an arrow-shaped decoration element) or control elements to selected code lines to allow the software developer to select a certain execution instance (EI) of a reentrant item which may be a function or a loop, to identify which source code lines have been previously viewed/executed, or to identify which source code line will be executed next in the selected execution instance. The compiled source code and program trace information may also be used to generate a drop-down control element for a source code line identifying which execution instance of the source code lines is being executed, alone or in combination with associated timestamp values, hyperlink elements for accessing other source code lines, or interrupt or exception indication control elements to identify the moment when the execution instance has been interrupted.

To facilitate the generation of visual cue elements, the source code editor 210 may include a plurality of predefined execution instance (EI) decoration control elements 211 stored in memory, either as part of the source code editor 210 or elsewhere. As described herein, the predefined execution instance decoration control elements 211 may include an arrow-shaped GUI decoration element for indicating source code line branches, a lightning-bolt-shaped GUI decoration element for indicating an interrupt or exception event, a triangle-shaped GUI decoration element for indicating a drop-down control element can be selected to display and choose between one or more execution instances, and the like. In this way, the source code decorator component 212 can quickly and efficiently access predefined execution instance GUI decoration control elements 211 when generating the visual cue elements for decorating the source code lines.

Though not shown, the source code editor 210 may also include a UI viewer component for displaying the decorated source code 252 in the source code editor viewer 251 at display 250. In the simplified example of FIG. 2, the decorated source code 252 includes a plurality of source code lines which are decorated by visual cue elements 253-255 which aid the user with understanding the program flow in a given execution instance. A first visual cue element is the drop-down control element 253 for the first source code line ("int main( )"). In this example, the triangle shape indicates that there are drop-down options that may be viewed upon selection by the user, and the "startup/1" indicates that the first execution instance is being displayed. In addition, the drop-down control element 253 also displays the caller function of main (_startup). In this example-_startup is the only function that calls main and this happened only once during the trace session. A second visual cue element is the branch/jump path element 254 for the second source code line ("if (g_false_condition)"). In this example, the branch/jump path element 254 is displayed as an arrow-shaped decoration to indicate the next source code line executed in this execution instance ("InterruptTest( )"). In other embodiments, the branches or jumps in the execution path may be visually indicated by using different colors for executed lines (e.g., black) and un-executed lines (e.g., grey). As will be appreciated, a mixture of these two decoration methods may be used. A third visual cue element is the timestamp element 255 for the corresponding source code line ("InterruptTest( )"). In this example, the timestamp element 255 indicates the timestamp value 189488 to identify the relative timing of the indicated source code line in this execution instance.

As disclosed hereinabove, the source code decorator component 212 may be configured or otherwise provided in software to execute an algorithm which detects specific program events (e.g., function call, interrupt, branches, etc.) from the source code 202 and program trace information 235, and which creates a corresponding execution instance with associated program behavior information for that execution instance. Using selection control and function hyperlinks in the decorated source code, the software developer can navigate execution instances in the source code editor viewer 251 while preserving the order of execution instances to allow offline browsing and inspection of the program execution history, without requiring a separate IDE trace viewer 256.

Figure 3:
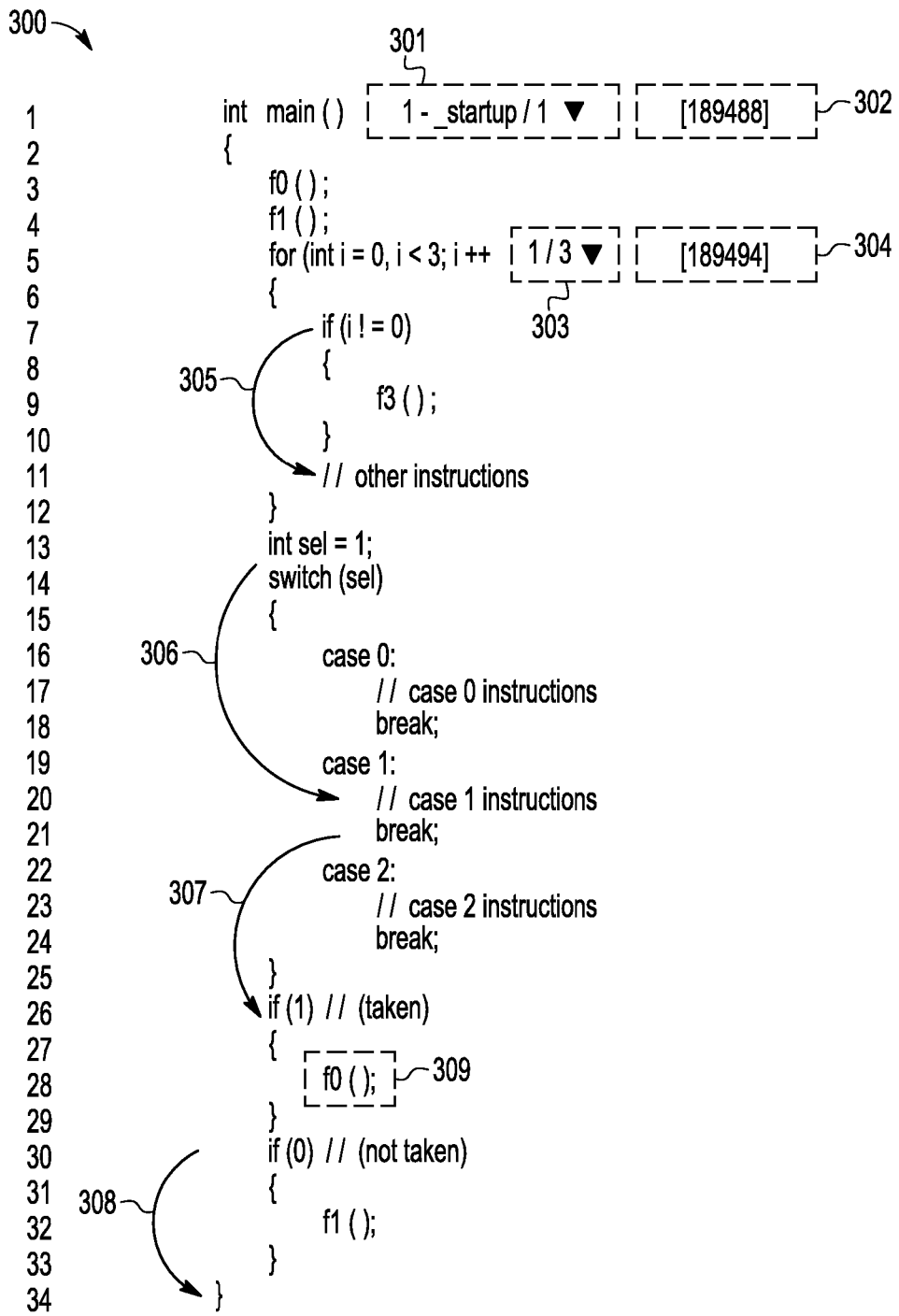
FIG. 3 illustrates a first decorated source code sequence with execution instance controls and indicators displayed at a source code editor viewer for navigating the program execution history in accordance selected embodiments of the present disclosure.

To further illustrate selected source code decoration embodiments, reference is now made to FIG. 3 which illustrates a first decorated source code sequence 300 with execution instance controls and indicators 301-309 displayed at a source code editor viewer to display the execution history of a program and navigate the program execution history in accordance selected embodiments of the present disclosure. In the depicted source code sequence 300, a first source code line (e.g., "int main ( )") represents the beginning of the declaration of main function. To illustrate how the source code lines are executed, the first source code line is decorated with a first drop-down control 301 that allows selection of a specific execution instance of the source code line (e.g., "main") from all calls found in the trace. The first drop-down control 301 may be formatted (e.g., "1-_startup/1") to indicate the call index (e.g., 1), the caller (e.g., "startup", and the total number of calls (e.g., "/1"). The first source code line also includes a timestamp text box 302 that adds time information (e.g., "[189488]") to the execution instance. In similar fashion, the fourth source code line (e.g., "for (int i=0; i<3; i++)") is decorated with a second drop-down control 303 that allows selection of a specific iteration from a loop to visually indicate the <iteration>/<total number of iterations>. In the example drop-down control 303, the indication "(e.g., ⅓)" indicates that the source code line is executed 3 times, and that the selected iteration is the first of three. In this example, a loop EI is displayed only in the context of a function EI. Therefore, only iterations executed during the current (selected) function EI will be displayed as loop EIs. There is a parent-child relation between code blocks, i.e. a function is a parent of a loop block. When a particular function EI of the parent block is selected, only the loop EIs executed during the selected parent EI are displayed in the loop drop-down control. The fourth source code line also includes a timestamp text box 304 that adds time information (e.g., [189494]) to the execution instance.

To visually show branches or jumps taken in the depicted source code sequence 300, the source code lines are decorated with navigation decoration elements 305-308. For example, a first arrow-shaped navigation decoration element 305 shows that, in the first iteration of the fourth source code line, the f3 function is not called (or jumped) since the value i≠0. In similar fashion, the second arrow-shaped navigation decoration element 306 shows a branch form the switch statement code line (e.g., "switch (sel)") specifying a "case 1" code behavior, while the third arrow-shaped navigation decoration element 307 shows that the "break" code line exits the switch statement to branch to the destination code line (e.g., "if (1)//(taken)"). The fourth or final loop or branch in the depicted source code sequence 300 is indicated with the fourth arrow-shaped navigation decoration element 308. In addition or in the alternative, a navigation decoration element may indicate which branches or jumps are taken in the execution path by using different colors to indicate executed lines (e.g., black) and un-executed lines (e.g., grey).

In any of the source code lines in the executed iteration, a function call (e.g., f0, f1, f3) may be decorated with a hyperlink decoration element to allow navigation between execution instances called from the current context. For example, the hyperlink decoration element 309 for the function name "f0 ( )" may be clicked to open the function instance that is called by the current caller instance, thereby changing the program source view by showing to f0( ) declaration. It should also be noted that the drop-down control 301 may contain hyperlinks to the caller execution instances so that, if user expands drop-down and clicks on a caller function, the program source view will display the caller execution instance.

Figure 4:
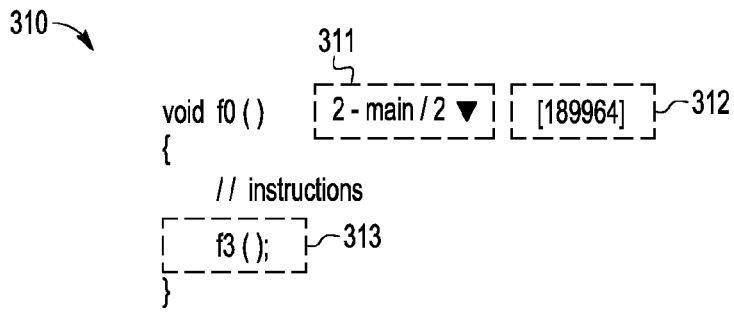
FIG. 4 illustrates a second decorated source code sequence with execution instance controls and indicators displayed at the source code editor viewer after selection of a control in the first decorated source code sequence shown in FIG. 3.

To further illustrate selected source code decoration embodiments, reference is now made to FIG. 4 which illustrates a second decorated source code sequence 310 with execution instance controls and indicators 311-313 displayed at a source code editor viewer after selection of a control in a previously displayed decorated source code sequence. In particular, the second decorated source code sequence 310 is displayed in the source code editor viewer after the user clicks on the f0 link 309 shown in FIG. 3. In the depicted source code sequence 310, a first source code line (e.g., "void f0 ( )") is decorated with a first drop-down control 311 that allows selection of a specific execution instance of the source code line (e.g., "2-main/2") from all calls found in the trace. By decorating the first source code line with the first drop-down control 311 having a hyperlink which automatically displays the function (e.g., "main") and selected call instance (e.g., "2"), the user can use the hyperlink to navigate the decorated source code sequence 310. Note that the selected execution instance 311 corresponds to the second time f0 was called. The first source code line can also include a timestamp text box 312 to display time information (e.g., "[189964]") to the execution instance. In the source code line containing the function call f3, a hyperlink decoration element 313 allows navigation between execution instances to open the function instance f3 upon selection or clicking by the user, thereby changing the program source view by showing to f3( ) declaration.

Figure 5:
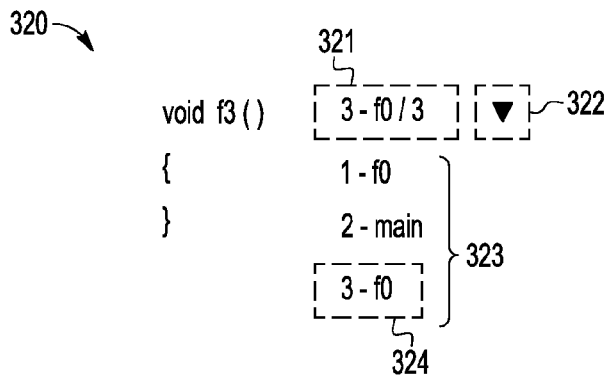
FIG. 5 illustrates a third decorated source code sequence with execution instance controls and indicators displayed at the source code editor viewer after selection of a control in the second decorated source code sequence shown in FIG. 4.

To further illustrate selected source code decoration embodiments, reference is now made to FIG. 5 which illustrates a third decorated source code sequence 320 with execution instance controls and indicators 321-323 displayed at a source code editor viewer after selection of a control in a previously displayed decorated source code sequence. In particular, the third decorated source code sequence 320 is displayed in the source code editor viewer after the user clicks on the f3 link 313 shown in FIG. 4. In the depicted source code sequence 320, a first source code line (e.g., "void f3 ( )") is decorated with a first drop-down control 321 and drop-down icon 322 that allows selection of a specific execution instance of the source code line (e.g., "3–f0/3") from all calls found in the trace. By clicking or selecting the down icon 322, an expanded drop-down box 323 is displayed to enable the user to select current instance call from all calls (e.g., f0, main, f0) present in the program trace. In this example, the displayed calls present in the program trace may be ordered chronologically and may include an identification of the caller. Using the expanded drop-down box 323, the user is able to easily identify the context of the execution history. This enables backward navigation to the identified caller instances by clicking on the caller hyperlink. To this end, the drop-down options in the expanded drop-down box 323 may be decorated with a hyperlink decoration element (e.g., 324), the corresponding function call (e.g., f0) may be clicked or selected to navigate to the selected function instance. In this way, the user can easily navigate upwards (from callee to caller) throughout the execution instance stack to find out the full call stack of an event.

Figure 6:
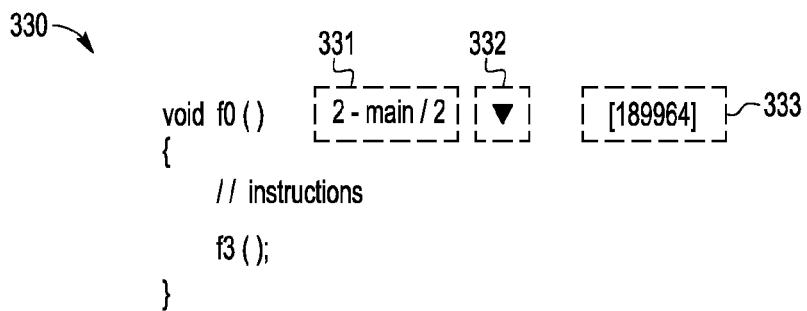
FIG. 6 illustrates a fourth decorated source code sequence with execution instance controls and indicators displayed at the source code editor viewer after selection of a control in the third decorated source code sequence shown in FIG. 5.

To further illustrate selected source code decoration embodiments, reference is now made to FIG. 6 which illustrates a fourth decorated source code sequence 330 with execution instance controls and indicators 331-333 displayed at a source code editor viewer after selection of a control in a previously displayed decorated source code sequence. In particular, the fourth decorated source code sequence 330 is displayed in the source code editor viewer after the user clicks on the f0 link 324 shown in FIG. 5. In the depicted source code sequence 330, a first source code line (e.g., "void f0 ( )") is decorated with a first drop-down control 331 and drop-down icon 332 that allows selection of a specific execution instance of the source code line (e.g., "2-main/2") from all calls found in the trace. Having returned back to the first source code line shown in FIG. 4, the depicted timestamp text box 333 displays the same time information (e.g., "[189964]") for the execution instance. In this example, the user can readily identify the navigation context which, in this case, is what happened when the function f2( ) was called the second time from main( ).

To further illustrate selected source code decoration embodiments, reference is now made to FIG. 7 which illustrates a fifth decorated source code sequence 340 with execution instance controls and indicators 341-348 displayed at a source code editor viewer, including an interrupt or exception use indication 348 to identify a moment when an execution instance has been interrupted. In the depicted source code sequence 340, the source code lines are decorated with a drop-down controls 341, 343 and timestamp text boxes 342, 344, and navigation code decoration elements 345-347 which function the same way as the execution instance controls and indicators 301-307 shown in FIG. 3. However, when an interrupt or exception occurs at a source code line (e.g., "*g_pIllegalPointer=0"), the corresponding source code line is decorated with an interrupt or exception indicator 348 which may include an "interrupt" icon (e.g., lightning bolt) or other indicator that a runtime exception or interrupt has occurred, indicating that the current execution instance has stopped at this point. By decorating the interrupt/exception indicator 348 with a hyperlink decoration element, the user can navigate to the interrupt handler execution instance by selecting or clicking the interrupt/exception indication 348.

To further illustrate selected source code decoration embodiments, reference is now made to FIG. 8 which illustrates a sixth decorated source code sequence 350 with execution instance controls and indicators 351-352 displayed at a source code editor viewer after selection of a control in a previously displayed decorated source code sequence. In particular, the sixth decorated source code sequence 350 is displayed in the source code editor viewer after the user clicks on the interrupt/exception indicator 348 shown in FIG. 7. In the depicted source code sequence 350, a first source code line (e.g., "void_exception_handler ( )") is decorated with a first drop-down control 351 that allows selection of a specific execution instance of the source code line (e.g., "1-main/1") from all calls found in the trace. In the depicted example, the first drop-down control 351 displays the exception handler function with the corresponding selected execution instance (e.g., "1"). In addition, the first source code line is decorated with a timestamp text box 352 which displays the same time information (e.g., "[190964]") for the execution instance.

As illustrated with reference to the foregoing examples, software development tools may be configured to efficiently perform offline debugging by displaying the information contained in the program trace with the associated source code lines by decorating the source code lines with decorations elements derived from associated trace data, thereby providing an improved mechanism for identifying, selecting and navigating between execution instances in the program execution history.

Figure 9:
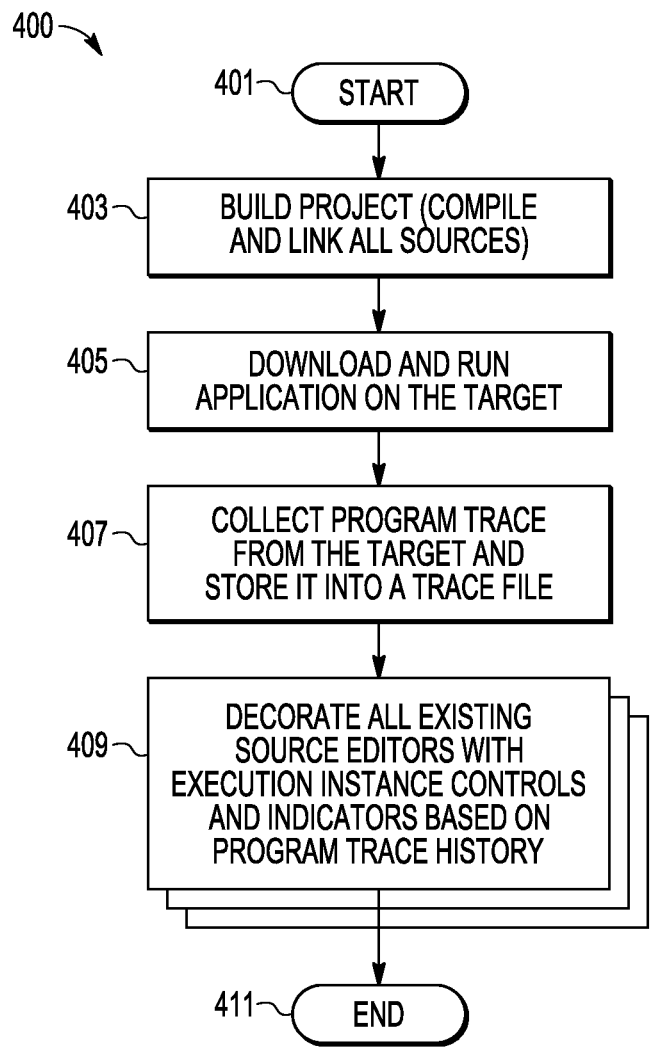
FIG. 9 illustrates a simplified flowchart of an example method of decorating a source code sequence at source code editor using source code and associated program trace information.

Referring now to FIG. 9, there is shown a simplified flowchart diagram 400 of an example method of decorating a source code sequence at source code editor using source code and associated program trace information. When the method starts (401), a developer builds a project at step 403, including one or more of writing or loading code in the source editor for viewing or editing. The build step 403 may also include using a compiler or interpreter to perform compiling and linking of all sources, thereby generating an executable application. Next, at 405, the compiled and linked application may be downloaded and run on the target device or platform, such as an embedded system, development board or machine. In selected embodiments, a debugger runs the executable on the target device or platform. At step 407, the program trace data generated by the target device/platform is collected and stored into a trace file to form a program trace history. The program trace data is used to identify execution instances in the program execution, such as the moment in a trace when each function is called, each iteration of a loop in the execution history, each branch or jump in the execution history, or each interrupt or exception in the execution history. At step 409, the collected program trace history is used to decorate the source code by decorating all existing or active (e.g., opened) source editors with one or more execution instance controls and indicators. The source code decorations may include a control that allows selection of an execution instance, a timestamp indication for a source code line, an arrow decoration to indicate branches or jumps on the code execution, hyperlinks for function names which connect to the execution instance called from the current context or interrupt indications. The decorated source code can be feed back to the source code editor in an iterative sequence of steps 409 for display at the source editor viewer. The presentation of decorated source code enables the developer to identify the root-cause of a problem in the code by analyzing information from both the trace data (which can indicate the execution history) and the source code (which can indicate the reason why a program branch was executed, such as indicating whether an if statement and the condition was true or false). At step 411, the method ends.

Figure 10:
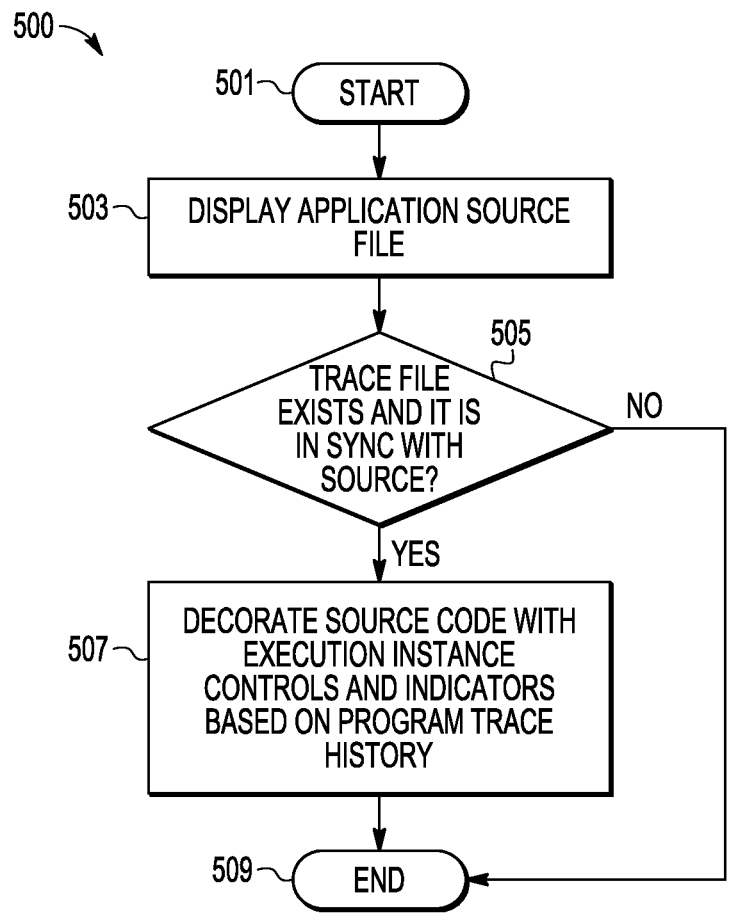
FIG. 10 illustrates a simplified flowchart of an example use-case method when the developer opens a source file after a trace session has been finished.

Turning now to FIG. 10, there is shown a simplified flowchart diagram 500 of an example use-case method when the developer opens a source file after a trace session has been finished, thereby enabling source code decoration to be performed offline from debugging operations. When the method starts (501), the developer has already built and compiled a source code project for execution on target hardware to generate and store program trace data that is collected and stored into a trace file to form a program trace history session for use in an offline source code decoration case. Next, at 503, the application source file is opened and displayed at a source code editor viewer, such as the source coder editor used to build the original source code. This step of opening and displaying the source file can occur after program trace data is generated and captured, such as by retrieving or loading the source file from memory. At step 505, the program trace history session is retrieved or loaded from memory and compared to the source file. If the comparison indicates that the program trace history session data is not synchronized with the source file (negative outcome to step 505), then the method ends at step 509. However, if the program trace history session data is synchronized with the source file (affirmative outcome to step 505), the program trace history session data is used to identify execution instances in the program execution and to decorate the source code with corresponding execution instance controls and indicators at step 507. The source code decorations may include one or more controls and indicators to allow interactive selection of called functions, execution history loop iterations, or interrupt events. The source code decorations may also include interactive navigations aids to identify the timestamp moment in a trace when each function is called, each iteration of a loop in the execution history, each branch or jump in the execution history, or each interrupt or exception in the execution history. The decorated source code enables the developer to identify the root-cause of a problem in the code by analyzing information from both the trace data (which can indicate the execution history) and the source code (which can indicate the reason why a program branch was executed, such as indicating whether an if statement and the condition was true or false). At step 509, the method ends.

Figure 11:
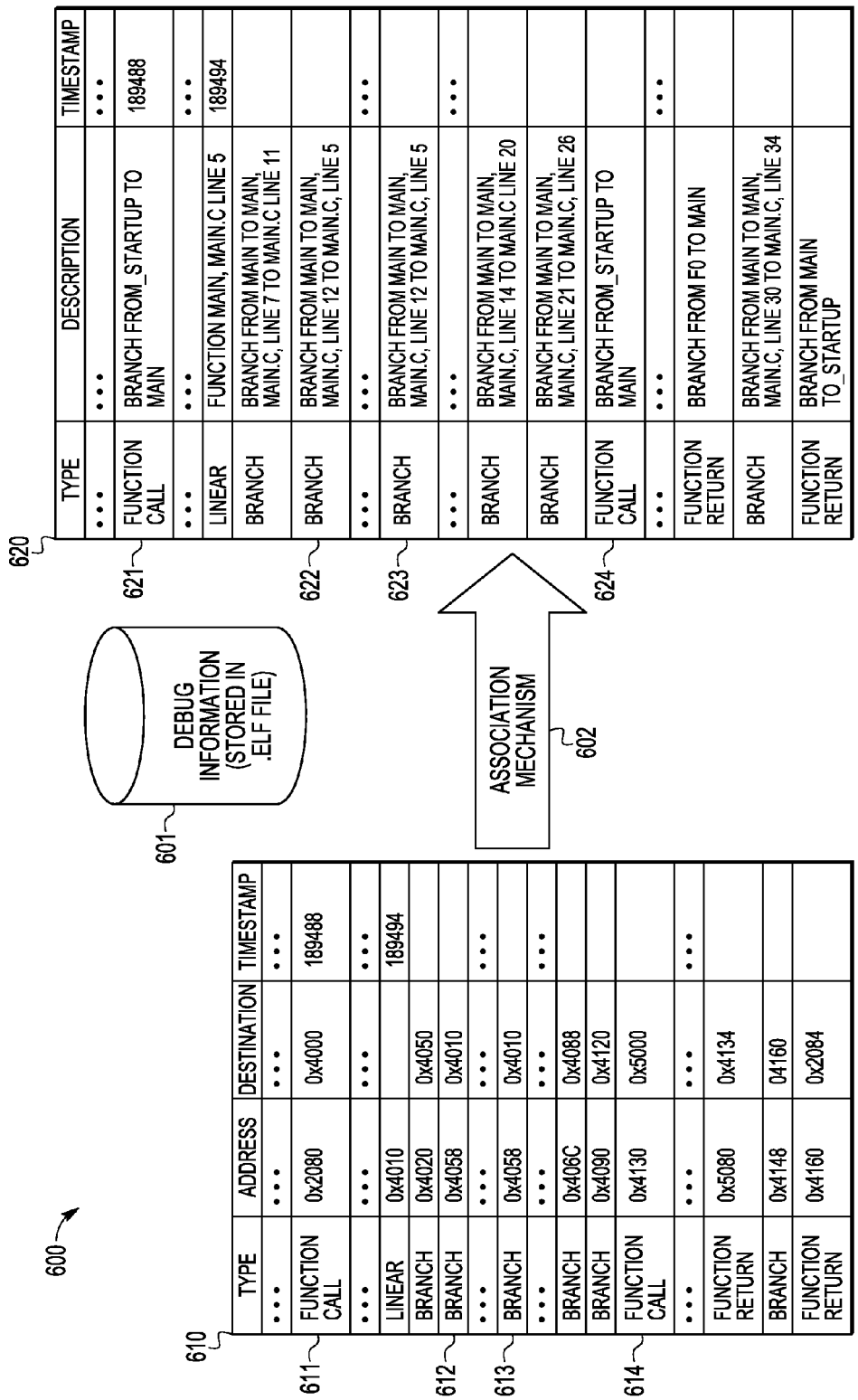
FIG. 11 illustrates an association mechanism which uses debug information to associate hardware addresses found in the hardware trace information with source code file information.

In accordance with selected embodiments of the present disclosure, the source code decoration methodology may use program counter (PC) data included in the hardware trace and source file information to find associations therebetween. For example, FIG. 11 illustrates a method and system 600 for resolving hardware trace information 610 into decoded trace information 620 using an association mechanism 602. In operation, the association mechanism 602 accesses debug information 601 stored in the .elf file to identify correspondence or associations between the addresses found in the hardware trace 610 and the source line information (file name, function name, line number), thereby generating decoded trace information 620 wherein each executed instruction 621-624 includes corresponding source file information, alone or in combination with a corresponding timestamp value. Since each executed instruction (e.g., 611) in the hardware trace 610 includes a specified program counter address (e.g., 0x2080) and destination (e.g., 0x4000) and each source line stored in the executable file 610 has a set of instructions with associated program counter address(es), the association mechanism 602 may use the shared or common program counter/address data to extract for each source line the linked program counter address(es), thereby generated decoded trace information 620 wherein each executed instruction (e.g., 621) is linked with an associated source line (e.g., Branch from-_startup to main").

The resulting decoded trace information 620 indicates which source lines were executed and also their execution order, thereby enabling the source code decorator to detect source line function calls (e.g., 621, 624) and branches (e.g., 622-623). For example, a source code decorator which receives the decoded trace information 620 as an input will effectively receive the trace data and associated source code lines. Using these inputs, the source code decorator may generate the first decorated source code sequence 300 shown in FIG. 3. After parsing all hardware trace data 610, the source code decorator detects that the main function 621 has been called one time from_startup. This information is used by the source code decorator to populate the first drop-down control 301 for the first source code line (e.g., "int main ( )"). Similarly, the source code decorator detects a "for" loop in line 5 where the sequence of instructions, between brackets, has been executed 3 times. This information is used by the source code decorator to populate the second loop drop-down control 303 for the fifth source code line (e.g., "for (int i=0; i<3; i++)"). At the first loop iteration at instruction 622, the source code decorator detects a branch and uses this information to draw the first arrow-shaped navigation decoration element 305 for the seventh source code line (e.g., "if (i !=0)") when first execution instance is selected ⅓. In addition, the source code decorator detects that the "f0 ( )" function call at instruction 624 and uses this information to place the hyperlink decoration element 309 at the 28th source code line to allow navigating to the f0 execution instruction.

By now it should be appreciated that there is provided herein a method and apparatus for navigating source code. In the disclosed methodology and apparatus, source code is loaded into a source code editor and then compiled and linked to generate application executable code which is executed on a target device to capture the resulting program trace data history. In various embodiments, the program trace data history may be captured by collecting program trace from a target device or platform, such as an embedded system, development board or machine. At a source code decorator, the program trace data history is processed to detect one or more execution instances, each associated with a source code block which was compiled to generate the application executable code. The source code decorator may be configured to detect one or more execution instances associated with the source code block by identifying shared program counter values in the program trace data history and the application executable code generated from the source code block. In selected embodiments, the source code may be loaded into the source code editor after or before capturing the program trace data history from the target. In addition, the source code decorator decorates each source code block on a graphical user interface viewer (e.g., a source code editor viewer) by displaying an execution instance control indicator corresponding to each detected execution instance. In selected embodiments, the source code blocks are decorated by displaying, next to a first source code line in a first source code loop block, an execution instance control indicator comprising an interactive drop-down control element to allow selection of a loop iteration for the first source code loop block. In other embodiments, the source code blocks are decorated by displaying, next to a first source code line in a first code block, an execution instance control indicator comprising an interactive drop-down control element to allow selection of an execution instance of a function call for the first source code block or to allow navigation back to a caller of a function call for the first source code block. In other embodiments, the source code blocks are decorated by displaying, next to a first source code line in a first source code block, an execution instance control indicator comprising a navigation decoration element identifying a branch or jump taken during a selected execution instance. In other embodiments, the source code blocks are decorated by displaying executed source code lines in a first source code block with a first color and displaying unexecuted source code lines in the first source code block with a second, different color. In other embodiments, the source code blocks are decorated by displaying, next to at least a first source code line, an execution instance control indicator comprising a timestamp text box for displaying time information for the first source code line. In other embodiments, the source code blocks are decorated by displaying, next to a first source code line, an execution instance control indicator comprising a hyperlink element that allows navigating between different execution instances of the source code. In other embodiments, the source code blocks are decorated by displaying, next to a first source code line, an execution instance control indicator comprising an interrupt or exception indication control element for the first source code line.

In another form, there is provided an apparatus and methodology for navigating source code. As disclosed, the apparatus includes a source code editor and a graphical user interface viewer for loading and editing source code for compilation and execution as application executable code on a target device. The apparatus also includes a debugger for capturing a program trace data history from the target device in response to execution of the application executable code on the target device. In addition, the apparatus includes a source code decorator for detecting one or more execution instances from the program trace data history, each execution instance associated with a source code block in the source code, and for decorating each source code block on the graphical user interface viewer by displaying an execution instance control indicator corresponding to each detected execution instance. The apparatus may also include a display for displaying decorated source code which includes a first source code line in a first source code loop block which is next to an execution instance control indicator comprising an interactive drop-down control element to allow selection of a loop iteration for the first source code loop block. In addition or in the alternative, the apparatus may include a display for displaying decorated source code which includes a first source code line in a first source code loop block which is next to an execution instance control indicator comprising an interactive drop-down control element to allow selection of an execution instance of a function call for the first source code block or to allow navigation back to a caller of a function call for the first source code block. In addition or in the alternative, the apparatus may include a display for displaying decorated source code which includes a first source code line in a first source code loop block which is next to an execution instance control indicator comprising a visual decoration element identifying a branch or jump taken during a selected execution instance. In addition or in the alternative, the apparatus may include a display for displaying decorated source code which includes at least a first source code line which is next to an execution instance control indicator comprising a timestamp text box for displaying time information for the first source code line, a hyperlink element that allows navigating between different execution instances of the source code, or an interrupt or exception indication control element for the first source code line.

In another form, there is disclosed a non-transitory computer program product having executable program code that, when executed by programming signal processing logic within a software development tool, enables a user to navigate source code by performing specified actions to capture program trace date history, detect one or more execution instances from the program trace data history, and thereby decorate a source code block with an execution instance control indicator. In operation, the computer program product is configured to capture program trace data history from a target in response to execution of application executable code on the target device. In addition, the computer program product is configured to detect one or more execution instances from the program trace data history, each execution instance associated with a source code block which is compiled to generate the application executable code. Finally, the computer program product is configured to decorate each source code block on a graphical user interface viewer by displaying an execution instance control indicator corresponding to each detected execution instance. As disclosed herein, each execution instance control indicator for each source code block may include a drop down control for selecting an execution instance for said source code block and an indicator to show a sequence of source code lines that were executed at runtime in that execution instance.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of an integrated development environment system with associated software modules or hardware devices for building, compiling, and debugging software without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

Although the described exemplary embodiments disclosed herein are directed to various computer products, computing devices, and methodologies for generating decorated source code files, the present invention is not necessarily limited to the example embodiments which illustrate inventive aspects of the present invention that are applicable to a wide variety of information processing systems and circuits. Thus, the particular embodiments disclosed above are illustrative only and should not be taken as limitations upon the present invention, as the invention may be modified and practiced in different but equivalent manners apparent to those skilled in the art having the benefit of the teachings herein. For example, although FIG. 1 and the discussion thereof describe an exemplary integrated development environment architecture, this exemplary architecture is presented merely to provide a useful reference in discussing various aspects of the invention, and is not intended to be limiting so that persons of skill in the art will understand that the principles taught herein apply to other types of devices. For example, selected embodiments may implement the illustrated components of the IDE system 100 on a single integrated circuit or within a single data processing system. Alternatively, IDE system 100 may include any number of separate integrated circuits or separate data processing systems interconnected with each other. Furthermore, those skilled in the art will recognize that boundaries between the functionality of the above described operations merely illustrative. The functionality of multiple operations may be combined into a single operation, or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

The source code decorator computer product, computing device, system, and methodology may include or use computer program code executable on one or more central processing units or other processing devices to provide facilities to computer programmers for software development, including a source code editor and build tools, debugger, and trace source decorator. As such, the source code decorator may be implemented by way of executable program code stored within a non-transitory computer program. As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.).

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for navigating source code, comprising:
    capturing a program trace data history from a target in response to execution of application executable code on the target device;
    detecting one or more execution instances from the program trace data history, each execution instance associated with a source code block which is compiled to generate the application executable code; and
    decorating each source code block on a graphical user interface viewer by displaying, next to a first source code line in a first source code loop block, an execution instance control indicator comprising an interactive drop-down control element to allow selection of a loop iteration for the first source code loop block.

2. The method of claim 1, further comprising loading source code into a source code editor and compiling and linking the source code to generate the application executable code prior to capturing the program trace data history from the target.

3. The method of claim 1, further comprising loading source code into a source code editor after capturing the program trace data history from the target.

4. The method of claim 1, where capturing the program trace data history from the target comprises collecting program trace from a target device or platform, such as an embedded system, development board or machine.

5. The method of claim 1, where detecting one or more execution instances associated with the source code block comprises identifying shared program counter values in the program trace data history and the application executable code generated from the source code block.

6. The method of claim 1, where decorating each source code block further comprises displaying, next to a second source code line in a second source code block, an execution instance control indicator comprising an interactive drop-down control element to allow selection of an execution instance of a function call for the second source code block.

7. The method of claim 1, where decorating each source code block comprises displaying, next to a second source code line in a second source code block, an execution instance control indicator comprising an interactive drop-down control element to allow navigation back to a caller of a function call for the second source code block.

8. The method of claim 1, where decorating each source code block comprises displaying, next to a second source code line in a second source code block, an execution instance control indicator comprising a navigation decoration element identifying a branch or jump taken during a selected execution instance.

9. The method of claim 1, where decorating each source code block comprises displaying executed source code lines in a second source code block with a first color and displaying unexecuted source code lines in the second source code block with a second, different color.

10. The method of claim 1, where decorating each source code block comprises displaying, next to at least a second source code line, an execution instance control indicator comprising a timestamp text box for displaying time information for the second source code line.

11. The method of claim 1, where decorating each source code block comprises displaying, next to a second source code line, an execution instance control indicator comprising a hyperlink element that allows navigating between different execution instances of the source code.

12. The method of claim 1, where decorating each source code block comprises displaying, next to a second source code line, an execution instance control indicator comprising an interrupt or exception indication control element for the second source code line.

13. An apparatus for navigating source code, comprising:
a processor;
a source code editor and a graphical user interface viewer for loading and editing source code for compilation and execution as application executable code on a target device;
a debugger for capturing a program trace data history from the target device in response to execution of the application executable code on the target device; a source code decorator for detecting one or more execution instances from the program trace data history, each execution instance associated with a source code block in the source code, and for decorating each source code block on the graphical user interface viewer by displaying an execution instance control indicator corresponding to each detected execution instance; and
a display for displaying decorated source code comprising a first source code line in a first source code loop block which is next to a first execution instance control indicator comprising an interactive drop-down control element to allow selection of a loop iteration for the first source code loop block.

14. The apparatus of claim 13, where the decorated source code further comprises a second source code line in a second source code loop block which is next to a second execution instance control indicator comprising an interactive drop-down control element to allow selection of an execution instance of a function call for the second source code block or to allow navigation back to a caller of a function call for the second source code block.

15. The apparatus of claim 13, where the decorated source code further comprises a second source code line in a second source code loop block which is next to an execution instance control indicator comprising a visual decoration element identifying a branch or jump taken during a selected execution instance.

16. The apparatus of claim 13, where the decorated source code further comprises at least a second source code line which is next to an execution instance control indicator comprising a timestamp text box for displaying time information for the second source code line, a hyperlink element that allows navigating between different execution instances of the source code, or an interrupt or exception indication control element for the second source code line.

17. A non-transitory computer program product having executable program code that, when executed by programming signal processing logic within a software development tool, enables a user to navigate source code by performing actions comprising:
capturing a program trace data history from a target in response to execution of application executable code on the target device;
detecting one or more execution instances from the program trace data history, each execution instance associated with a source code block which is compiled to generate the application executable code; and
decorating each source code block on a graphical user interface viewer by displaying, next to a first source code line in a first source code loop block, an execution instance control indicator comprising an interactive drop-down control element to allow selection of a loop iteration for the first source code loop block.

18. The non-transitory computer program product of claim 17, wherein said execution instance control indicator for each source code block comprises a drop down control for selecting an execution instance for said source code block and an indicator to show a sequence of source code lines that were executed at runtime in that execution instance.

* * * * *